United States Patent
Kalpathi

[19]

[11] Patent Number: 6,137,248
[45] Date of Patent: Oct. 24, 2000

[54] SENSING LOAD AND/OR SPEED CHANGES IN A SWITCHED RELUCTANCE MOTOR THROUGH CURRENT CHOPPING

[75] Inventor: Ramani R. Kalpathi, Ann Arbor, Mich.

[73] Assignee: Dana Corporation, Toledo, Ohio

[21] Appl. No.: 09/306,155

[22] Filed: May 6, 1999

[51] Int. Cl.$^7$ ................................................ H02K 23/00
[52] U.S. Cl. .................. 318/254; 318/138; 318/439; 318/798; 318/811; 318/802; 318/803; 318/808; 318/810
[58] Field of Search .................................. 318/254, 138, 318/439, 798, 811, 801, 803, 802, 810, 808

[56] References Cited

U.S. PATENT DOCUMENTS

| | | | |
|---|---|---|---|
| Re. 33,665 | 8/1991 | Ogawa | 318/798 |
| 4,134,055 | 1/1979 | Akamatsu | 318/696 |
| 4,322,671 | 3/1982 | Kawada et al. | 318/798 |
| 4,520,302 | 5/1985 | Hill et al. | 318/696 |
| 4,707,650 | 11/1987 | Bose | 318/685 |
| 4,933,621 | 6/1990 | MacMinn et al. | 318/696 |
| 4,959,596 | 9/1990 | MacMinn et al. | 318/254 |
| 5,166,591 | 11/1992 | Stephens et al. | 318/701 |
| 5,525,887 | 6/1996 | Van Sistine | 318/701 |
| 5,530,333 | 6/1996 | Turner | 318/701 |
| 5,627,445 | 5/1997 | Webster | 318/701 |
| 5,677,607 | 10/1997 | Sugiyama et al. | 318/439 |

*Primary Examiner*—Karen Masih
*Attorney, Agent, or Firm*—Dykema Gossett PLLC

[57] ABSTRACT

A method for detecting a change in motor load and/or motor speed is provided. The method includes the step of measuring the number of transitions (i.e., state changes) of a phase control signal in a motor phase of the motor. The method also includes the step of comparing the number of transitions to a predetermined number that is indicative of a predetermined motor load and/or motor speed. The predetermined number may comprise the number of transitions in a prior phase control signal of the motor. A method for controlling a motor responsive to a change in motor load and/or motor speed is also provided. The method includes the above-described steps for detecting a change in motor load and/or motor speed and further includes the step of selecting one of a plurality of operating modes for the motor responsive to a comparison value obtained by comparing the measured transition number with the predetermined transition number.

18 Claims, 5 Drawing Sheets

SENSING LOAD AND/OR SPEED CHANGES IN A SWITCHED RELUCTANCE MOTOR THROUGH CURRENT CHOPPING

BACKGROUND OF THE INVENTION

1. Field of the Invention

This invention relates to switched reluctance motors, and, more particularly, to a method for sensing a change in load and/or speed in a switched reluctance motor by monitoring a phase control signal of the motor and a method for controlling the motor in response thereto.

2. Disclosure of Related Art

A conventional switched reluctance motor (SRM) includes a stator having a plurality of pairs of diametrically opposed stator poles and a rotor having a plurality of pairs of diametrically opposed rotor poles. Windings or coils are typically disposed about the stator poles and the windings around any two diametrically opposed stator poles may be connected in series or in parallel to define one motor phase of the multiphase SRM. The windings associated with a motor phase may be referred to as a phase coil. By generating current through the phase coil, magnetic fields are established about the stator poles and a torque is produced that attracts a pair of rotor poles into alignment with the stator poles. The current in the phase coils is generated in a predetermined sequence in order to produce a constant torque on the rotor. The period during which current is provided to the phase coil—and the rotor poles are brought into alignment with the stator poles—is known as the "active stage" or conduction interval of the motor phase. At a certain point—either as the rotor poles become aligned with the stator poles or at some point prior thereto—it becomes desirable to commutate the current in the phase coil to prevent a negative or braking torque from acting on the rotor poles. Once this "commutation point" is reached, current is no longer generated in the phase coil and the current is allowed to dissipate from the phase coil. The period during which current is allowed to dissipate from the phase coil is known as the "inactive stage" of the motor phase.

SRMs may be operated in a plurality of operating modes depending upon speed and torque requirements so that maximum efficiency of the motor is obtained. For example, a three phase SRM may be operated by energizing one, two, or all three phases of the motor depending upon the required speed and torque. In order to maximize motor efficiency, therefore, it is desirable to be able to determine when a change in motor load and/or motor speed occurs. Conventional devices and methods for sensing changes in motor load and/or motor speed rely on torque transducers. Torque transducers are relatively expensive, however, and substantially increase the cost of the motor and/or its control system.

There is thus a need for a method for detecting a change in load and/or speed in a switched reluctance motor that will minimize or eliminate one or more of the above-mentioned deficiencies.

SUMMARY OF THE INVENTION

The present invention provides a method for detecting a change in at least one of a speed of a motor and a load on the motor. The present invention also provides a method for controlling a motor responsive to such a change in speed and/or load.

An object of the present invention is to provide a method for detecting a change in motor speed and/or motor load and a method for controlling a motor in response thereto that are less expensive than conventional devices and methods.

A method in accordance with the present invention for detecting a change in at least one of a speed of a motor and a load on the motor includes the step of measuring a first number of transitions (i.e., state changes) of a first phase control signal of the motor. The first phase control signal may be associated with a first motor phase of the motor and may be used to maintain a current within a phase coil in the first motor phase at or below a predetermined level or within a hysteresis current band. The method may further include the step of comparing the first number of transitions of the first phase control signal to a predetermined number. The predetermined number may be indicative of at least one of a predetermined speed of the motor and a predetermined load on the motor. The predetermined number may comprise a second number of transitions of a second phase control signal of the motor. The second phase control signal may be associated with the first motor phase or with a second motor phase. The comparison step may also yield a comparison value indicative of whether there has been a change in motor load and/or motor speed and the amount of such a change.

A method for controlling a motor in accordance with the present invention includes the above-described steps of measuring the number of transitions of a phase control signal of the motor and comparing the number of transitions to a predetermined number to obtain a comparison value. The method further includes the step of selecting an operating mode of the motor responsive to the comparison value. For example, the comparison value may indicate that the number of transitions of the phase control signal relative to the predetermined number is indicative of a decrease in speed and/or increase in motor load. As a result an operating mode may be selected in which additional motor phases are energized in order to maintain the speed of the motor at a preset level.

A method in accordance with the present invention may be implemented using relatively small, inexpensive, and reliable integrated circuits. As a result, use of the inventive method requires less space and is less expensive than conventional methods and devices for detecting changes in motor load and/or motor speed.

These and other features and objects of this invention will become apparent to one skilled in the art from the following detailed description and the accompanying drawings illustrating features of this invention by way of example.

DETAILED DESCRIPTION OF THE PREFERRED EMBODIMENT

Figure 1:
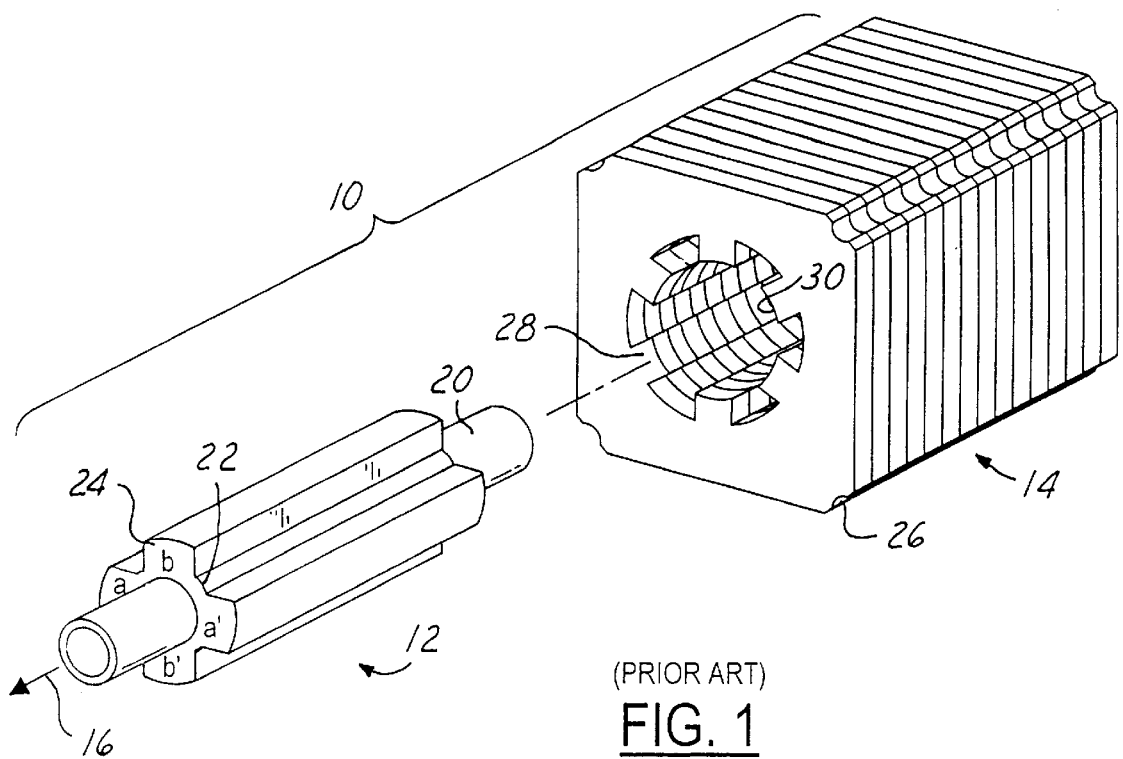
FIG. 1 is an exploded perspective view of a conventional switched reluctance motor.
Figure 2:
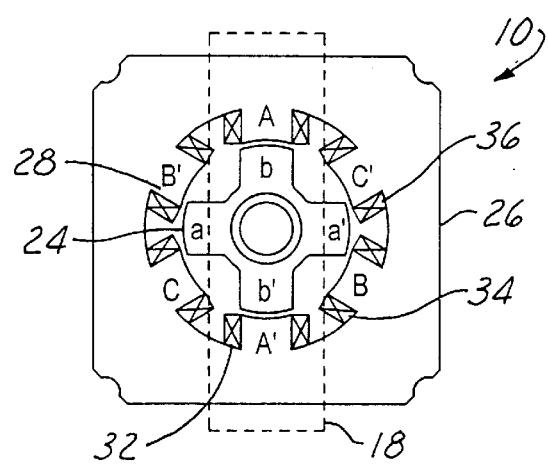
FIG. 2 is a cross-sectional view of a conventional switched reluctance motor.

Referring now to the drawings wherein like reference numerals are used to identify identical components in the various views, FIGS. 1 and 2 illustrate a conventional switched reluctance motor 10. Although the illustrated motor comprises a switched reluctance motor, it should be understood that the invention as disclosed herein could be applied to other motors as is known in the art. Motor 10 includes a rotor assembly 12 and a stator assembly 14, both of which may be centered about an axis 16. A representative motor phase 18 is indicated by a dashed-line box, while the other two motor phases are not shown. Although the illustrated embodiment includes three motor phases 18, it will be understood by those skilled in the art that the number of motor phases 18 may vary.

Rotor assembly 12 is provided to move a load (not shown) connected to rotor assembly 12. Assembly 12 includes a shaft 20 and a rotor 22 disposed about shaft 20. Shaft 20 is provided to engage either the load or another means for engaging the load. Shaft 20 extends longitudinally along axis 16 and may be centered about axis 16. Rotor 22 is provided to impart rotation to shaft 20 and is capable of clockwise or counter-clockwise rotation. Rotor 22 may be made from a material having a relatively low magnetic reluctance, such as iron. Rotor 22 may be centered about axis 16 and may include a spline or key (not shown) configured to be inserted within a keyway (not shown) in shaft 20. Rotor 22 includes a plurality of radially outwardly extending rotor poles 24 configured as diametrically opposed rotor pole pairs a–a', b–b'. Each of poles 24 is generally rectangular in cross-section and may include one or more radially outwardly extending teeth as is known in the art. It will be understood by those skilled in the art that the number of poles 24 of rotor 22 may vary.

Stator assembly 14 is provided to produce a torque to cause rotation of rotor assembly 12. Stator assembly 14 may comprise a plurality of laminations 26 that are formed from a material, such as iron, having a relatively low magnetic reluctance. Assembly 14 includes a plurality of radially inwardly extending poles 28 configured as diametrically opposed stator pole pairs A–A', B–B', C–C'. Each pair of stator poles 28 is provided to attract a corresponding pair of rotor poles 24 of rotor assembly 12 and thereby cause rotation of rotor assembly 12. Poles 28 are generally rectangular in cross-section and may include one or more radially inwardly extending teeth (not shown) as is known in the art. Poles 28 may extend along the axial length of stator assembly 14 and define a bore 30 that is adapted to receive rotor assembly 12. It will be understood by those in the art that the number of stator poles 28 may vary.

Rotation of rotor assembly 12 is produced by initiating, and later commutating, in a predetermined sequence, conduction cycles in phase coils 32, 34, 36 surrounding each stator pole pair. Phase coils 32, 34, 36 are formed by connecting, in series or in parallel, windings on diametrically opposed stator poles 28. As one of phase coils 32, 34, 36 begins to conduct current, the nearest rotor pole pair is magnetically attracted towards the stator pole pair around which the energized phase coil is wound. By initiating and commutating conduction cycles in phase coils surrounding consecutive stator pole pairs, a relatively constant torque can be produced.

Figure 3:
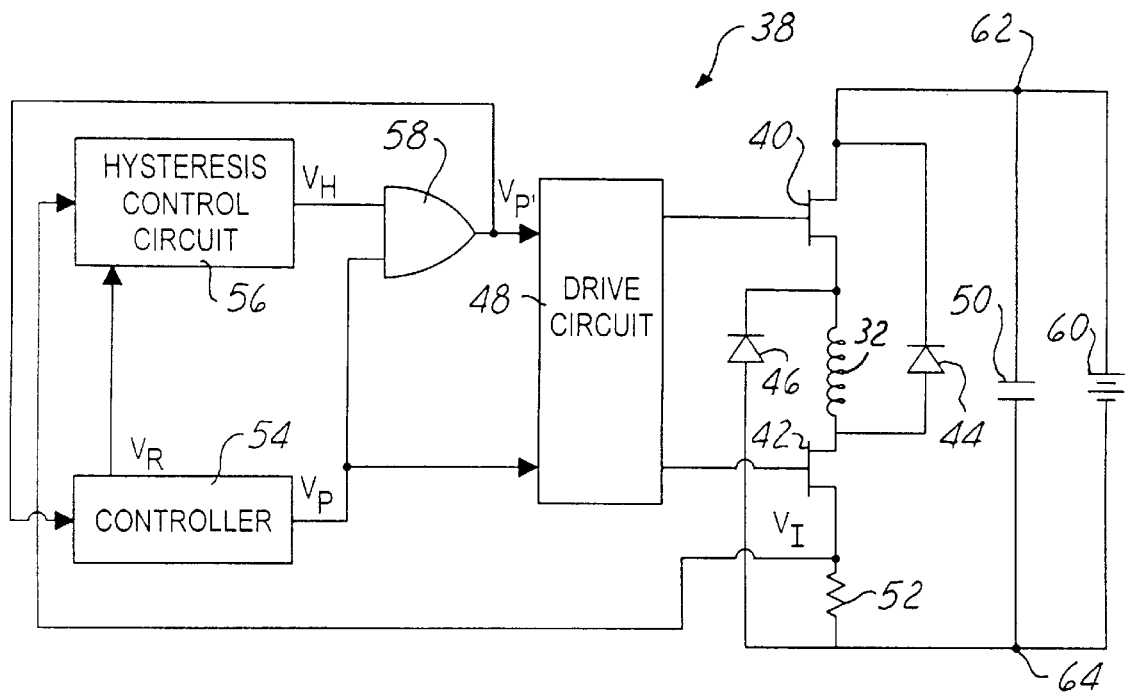
FIG. 3 is a combination schematic and block diagram illustrating a circuit for a motor phase of a switched reluctance motor.

Referring now to FIG. 3, a circuit 38 for controlling motor 10 is illustrated. Circuit 38 may include the following elements: means, such as switches 40, 42, for selectively providing current to phase coil 32; diodes 44, 46; a drive circuit 48; a capacitor 50; means, such as resistor 52, for sensing the current in phase coil 32; a controller 54; a hysteresis control circuit 56; and a logic circuit 58. Circuit 38 represents an equivalent circuit for one motor phase 18 of motor 10. It should be understood, however, that portions of circuit 38, such as controller 54, may form part of additional motor phases 18.

Switches 40, 42 are provided to selectively couple a power supply 60 to phase coil 32 to energize and deenergize coil 32. Switches 40, 42 are conventional in the art and may take any of a plurality of forms well known in the art. For example, switches 40, 42 may comprise MOSFETs. Switch 40 is connected to a first end of coil 32 in series with coil 32. Switch 42 is connected to a second end of coil 32, also in series with coil 32. Switches 40, 42 are responsive to various control signals, such as phase control signals $V_P$ and $V_{P'}$ generated by controller 54 and logic circuit 58, respectively.

Diodes 44, 46 are provided to control the dissipation of current from coil 32 and, in particular, to return the current in coil 32 to capacitor 50 and power supply 60. Diodes 44, 46 are conventional in the art. Diode 44 may be connected in parallel with the series combination of switch 40 and coil 32. Diode 46 may be connected in parallel with the series combination of switch 42 and coil 32.

Drive circuit 48 is provided to adjust the voltage level of phase control signals $V_P$ and $V_{P'}$ in a conventional manner to account for different tolerances and requirements among the components of circuit 38. Drive circuit 48 is conventional in the art.

Capacitor 50 is provided to store the electrical energy dissipated from coil 32 when either of switches 40, 42 is opened. Capacitor 50 is conventional in the art and may have a first plate connected to a common node 62 and a second plate connected to a common node 64.

Resistor 52 is provided to generate a signal indicative of the level of current in coil 32 and is conventional in the art. Resistor 52 is connected in series with switch 42 and has one end connected to node 64. It will be understood by those in the art that a variety of conventional current sensors could be employed in place of resistor 52, including, but not limited to, Hall effect current sensors.

Controller 54 is provided to initiate and commutate conduction cycles in each motor phase 18 of motor 10. Controller 54 is also provided to monitor a phase control signal $V_{P'}$ in each phase 18 of motor 10, to measure the number of transitions (i.e., state changes) of signal $V_P$, and to compare the number of transitions to a predetermined number in order to obtain an indication of changes in motor load and/or motor speed. Controller 54 is conventional in the art and comprises a programmable microcontroller. Controller 54 generates phase control signals, such as phase control signal $V_P$, to control the initiation and commutation of the conduction interval in each motor phase 18. Controller 54 may also generate a reference voltage signal $V_R$ for use by hysteresis control circuit 58 in generating upper and lower hysteresis band limit signals. Controller 54 receives phase control signal $V_{P'}$ as an input for use in performing the operations identified above.

Hysteresis control circuit 56 is provided to control the current in phase coil 32 within a predetermined hysteresis current band. Circuit 56 may assume a variety of forms including, for example, the circuit described and illustrated in copending and commonly assigned U.S. application Ser. No. 09/094,803, the entire disclosure of which is incorporated herein by reference. Circuit 56 receives current indicative signal $V_I$ and reference voltage signal $V_R$ and generates a hysteresis control signal $V_H$ in response thereto. It should be understood that, although FIG. 3 illustrates a hysteresis control circuit 56, a method in accordance with the present invention may be implemented with any conventional circuit that employs current chopping to maintain the current within phase coil 32 at or below a predetermined current level.

Logic circuit 58 is provided to generate a phase control signal $V_P$ used to control one of switches 40, 42. Circuit 58 is conventional in the art and comprises an AND gate in the illustrated embodiment. It should be understood, however, that other gate configurations may be implemented without departing from the spirit of the present invention. Circuit 58 is responsive to phase control signal $V_P$ and hysteresis control signal $V_H$.

Figure 4A:
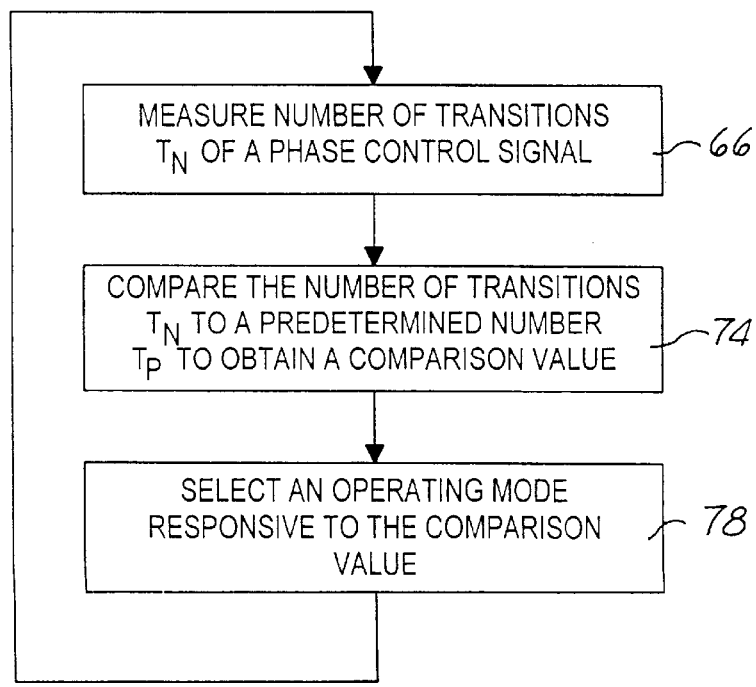
FIG. 4A is a flowchart diagram illustrating methods in accordance with the present invention for detecting a change in motor load and/or motor speed and for controlling a motor responsive thereto.
Figure 4B:
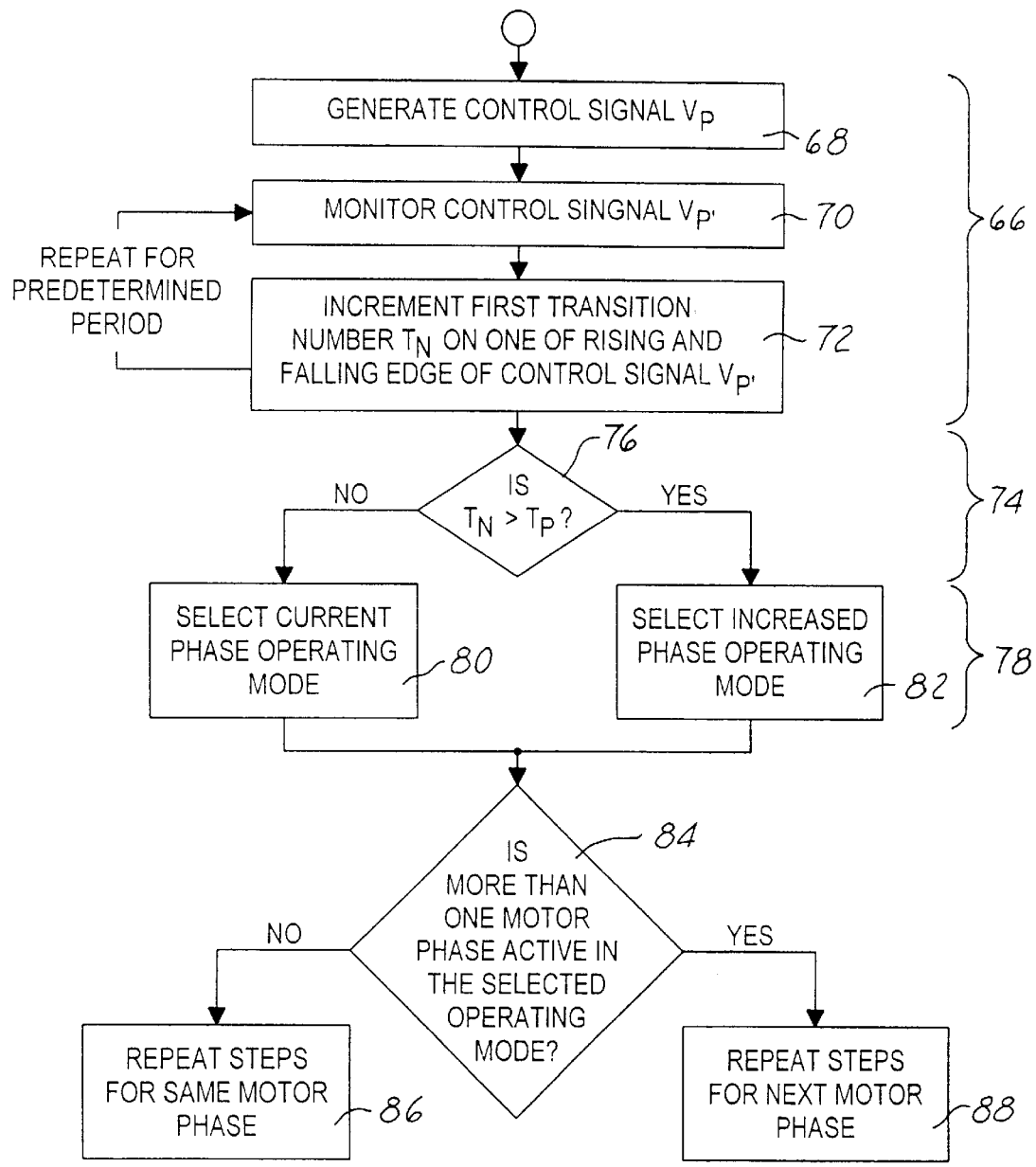
FIG. 4B is a flowchart diagram illustrating one embodiment of the methods illustrated in FIG. 4A.

Referring now to FIGS. 4A–B, methods in accordance with the present invention for detecting a change in speed and/or load in motor 10 and for controlling motor 10 in response thereto will be described. FIG. 4A illustrates these methods generally while FIG. 4B illustrates one potential embodiment of these methods. As shown in FIG. 4A, both methods may include the step 66 of measuring the number of transitions in a phase control signal $V_{P'}$. Referring to FIG. 4B, step 66 may include the substep 68 of generating phase control signal $V_P$. As described hereinabove with reference to FIG. 3, control signal $V_P$ may be generated by controller 54. Step 66 may also include the substep 70 of monitoring phase control signal $V_{P'}$. Signal $V_{P'}$ may be generated by logic gate 58 responsive to phase control signal $V_P$ and hysteresis control signal $V_H$. Finally, step 66 may also include the substep 72 of incrementing a first transition number $T_N$ responsive to either the rising or falling edge (or both) of signal $V_{P'}$. Referring again to FIG. 3, the first transition number $T_N$ may be stored in a memory (not shown) in controller 54 and incremented by a counter (not shown) within controller 54 that is triggered by the rising or falling edge (or both) of signal $V_{P'}$. Referring again to FIG. 4B, substeps 70 and 72 may be repeated for a predetermined period of time. In a preferred embodiment, the predetermined period of time comprises at least a portion of the active stage of a motor phase 18.

Referring again to FIG. 4A, a method for detecting a change in the speed or load of motor 10 and a method for controlling motor 10 in response thereto may further include the step 74 of comparing the first transition number $T_N$ of phase control signal $V_{P'}$ to a predetermined number $T_P$ in order to obtain a comparison value. The predetermined number $T_P$ is indicative of a predetermined speed or load for motor 10. As a result, a comparison between the measured transition number $T_N$ and the predetermined number $T_P$ will be indicative of a change in load and/or speed in motor 10. The predetermined number $T_P$ may comprise a pre-programmed value stored in a memory (not shown) within controller 54. Alternatively, the predetermined number $T_P$ may comprise a previously measured number of transitions of another phase control signal in motor 10. This latter phase control signal may be a prior signal within the same motor phase 18 of motor 10 or a signal within another motor phase 18 of motor 10.

Referring to FIG. 4B, in one embodiment of the inventive methods step 74 may include the substep 76 of determining whether the transition number $T_N$ is greater than the predetermined number $T_P$. It should be understood, however, that a comparison of the transition number $T_N$ and the predetermined number $T_P$ could be made in a variety of ways. For example, the comparison may involve other boolean operations for determining the relative value of one of the numbers $T_N$, $T_P$ to another of the numbers $T_N$, $T_P$ or non-boolean operations such as a subtraction of one of the numbers $T_N$, $T_P$ from another of the numbers $T_N$, $T_P$. The latter type of operation may be used to determine the amount of any change in motor speed and/or motor load in addition to whether or not there has been a change.

Referring again to FIG. 4A, a method for controlling motor 10 in accordance with the present invention may finally include the step 78 of selecting one of a plurality of operating modes for motor 10 responsive to the previously obtained comparison value. Referring now to FIG. 4B, in one embodiment of the present invention the plurality of operating modes may include a current phase operating mode (in which the number of active motor phases after the comparison remains the same as the number of active motor phases prior to the comparison) and an increased phase operating mode (in which the number of active motor phases after the comparison is greater than the number of active motor phases prior to the comparison). As described in greater detail hereinbelow, if the transition number $T_N$ is greater than the predetermined number $T_P$, an increase in motor load and reduction in motor speed may be indicated. Thus, in one embodiment of the present invention, where the transition number $T_N$ is not greater than the predetermined number $T_P$, step 78 may include the substep 80 of selecting the current phase operating mode in order to maintain the number of active phases 18 in motor 10 and the existing speed of motor 10. If the comparison value shows that the transition number $T_N$ is greater than the predetermined number $T_P$, step 78 may include the substep 82 of selecting the increased phase operating mode in order to energize additional motor phases 18 and increase the speed of motor 10. It should be understood that the operating modes and the manner of selection disclosed in FIG. 4B are exemplary only and that varying numbers and types of operating modes could be selected from and in different ways. For example, substep 76 may involve subtracting the predetermined number $T_P$ from the transition number $T_N$. The resulting non-boolean comparison value may then be used to select from more than two operating modes (in which, for example, varying numbers of motor phases 18 may be activated).

Referring again to FIG. 4A, methods in accordance with the present invention for detecting a change in motor load and/or motor speed and for controlling motor 10 in response thereto may include the step of repeating steps 66, 74, and 78. Referring to FIG. 4B, in one embodiment of the present invention, this step may include the substep 84 of determining whether motor 10 is functioning in an operating mode in which more than one phase 18 is active. If only one motor phase 18 is active within motor 10, the step may include the substep 86 of repeating steps 66, 74, and 78 for the same motor phase 18. If more than one motor phase 18 is active within motor 10, the step may include the substep 88 of repeating steps 66, 74, and 78 for a second motor phase 18 in motor 10. It should be understood, however, that FIG. 4B illustrates only one possible embodiment of the invention. For example, a method in accordance with the present invention may alternatively be implemented by repeating steps 66, 74, and 78 for the same motor phase 18 even if more than one motor phase 18 is active within motor 10.

Figure 5A:
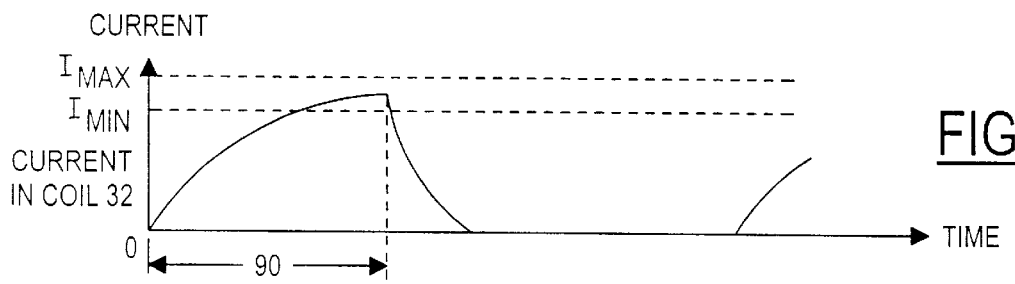
FIGS. 5A–E are timing diagrams illustrating voltage and current levels in the circuit of FIG. 3 over time for a motor operating at a first motor speed and load.
Figure 5B:
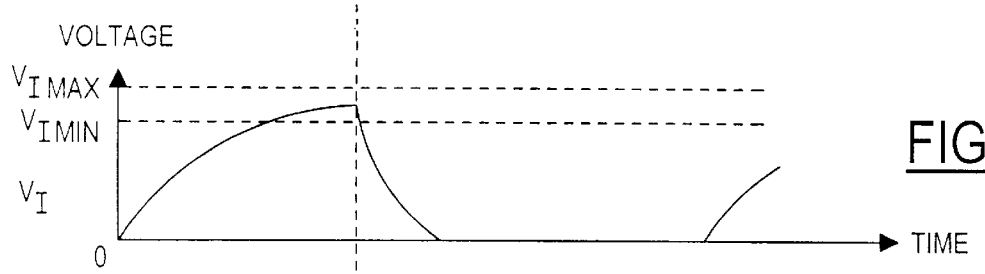
Figure 5C:
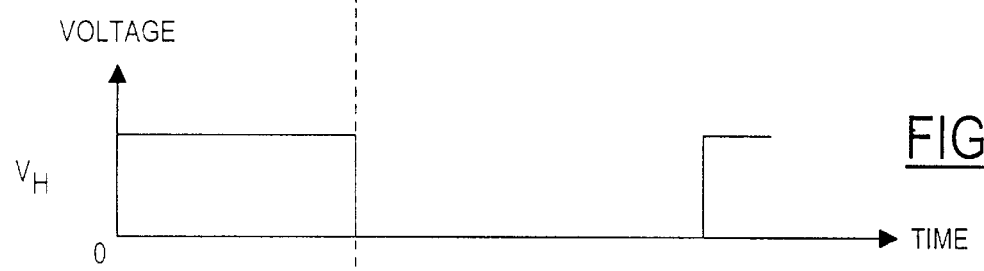
Figure 5D:
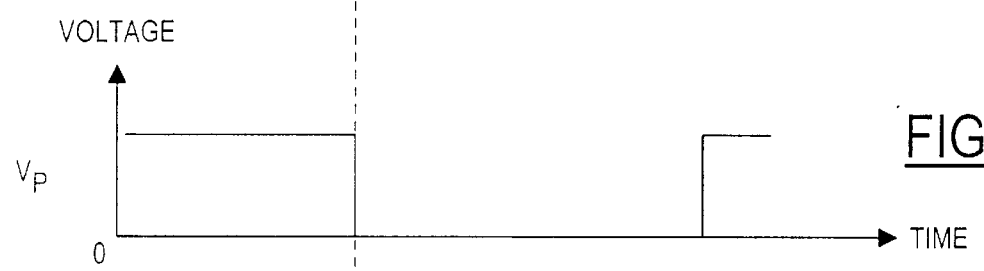
Figure 5E:
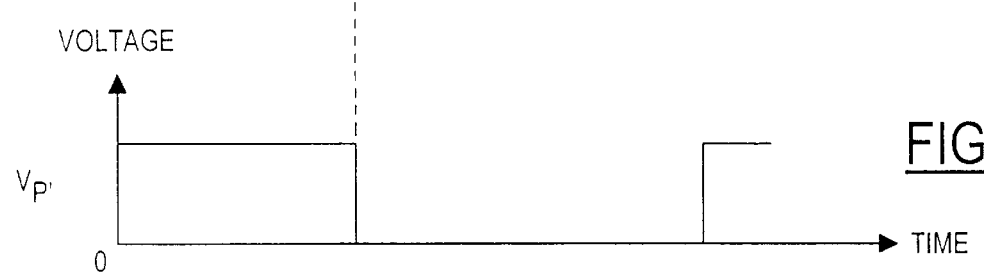
Figure 6A:
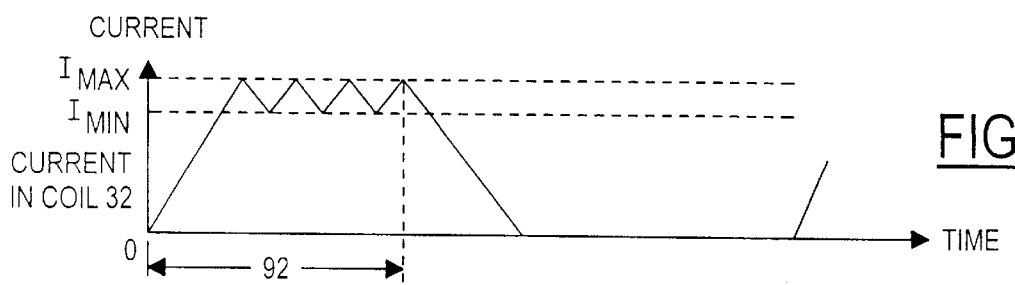
FIGS. 6A–E are timing diagrams illustrating voltage and current levels in the circuit of FIG. 3 over time for a motor operating at an increased load and decreased speed relative to the first motor load and speed in FIG. 5.
Figure 6B:
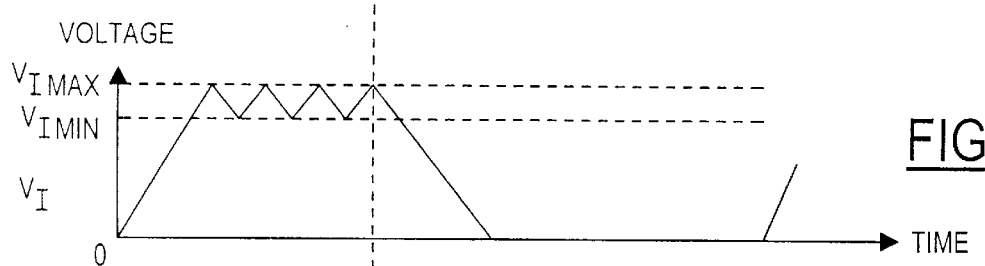
Figure 6C:
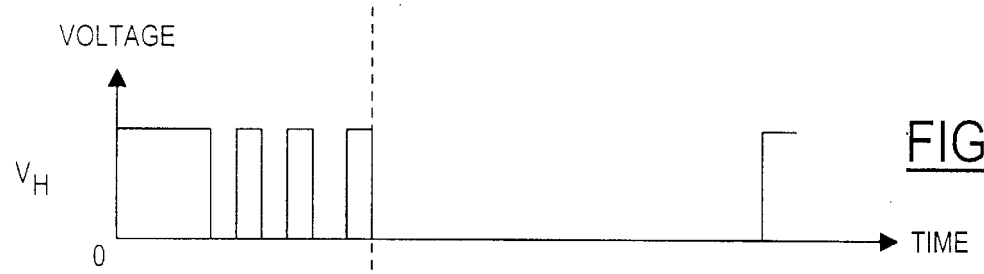
Figure 6D:
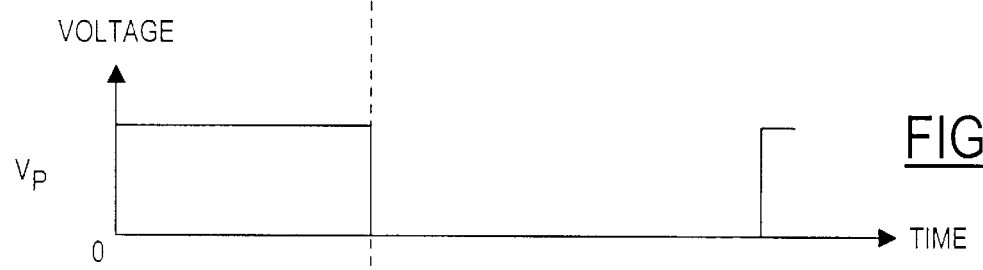
Figure 6E:
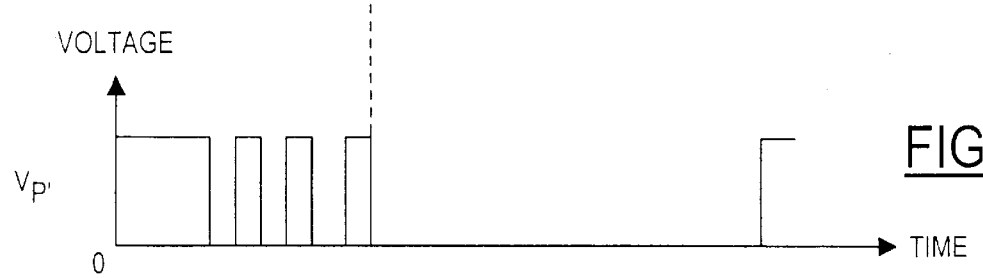

Referring now to FIGS. 5A–E and 6A–E, an example illustrating the operation of the inventive methods is provided. FIGS. 5A–E illustrate current and voltage levels in circuit 38 over time at a first motor load and speed. As shown in FIGS. 5A and 5B, the current in phase coil 32 during each conduction interval of a motor phase 18 fails to reach the predetermined maximum current level $I_{MAX}$. As a result, hysteresis control signal $V_H$ (FIG. 5C) is unchanged and phase control signal $V_P$, (FIG. 5E) does not transition (i.e., is not chopped) during the active stage 90 of a motor phase 18. FIGS. 6A–E illustrate current and voltage levels in circuit 38 over time at a second motor load and speed. In particular, FIGS. 6A–E illustrate current and voltage levels in circuit 38 over time after an increase in motor load and corresponding decrease in motor speed relative to the first motor load and speed in FIGS. 5A–E. As the speed of motor 10 decreases, the commutation frequency of motor 10 also decreases. As a result, the duration of the active stage 92 in each phase coil 18 increases and current is supplied to the phase coil for a longer period. It should be understood here that the time ordinates illustrated in the diagrams of FIGS. 6A–E are not equal to the time ordinates illustrated in the diagrams of FIGS. 5A–E and that the active stage 92 illustrated in FIG. 6A defines a longer period of time than the active stage 90 illustrated in FIG. 5A. Because current is provided to coil 32 for a longer period, the current in coil 32 reaches the predetermined maximum current level $I_{MAX}$ and current chopping is initiated. As a result, the number of transitions, or the chopping, of phase control signal $V_P$, increases as shown in FIG. 6E relative to the previously determined number of transitions, or chopping, of phase control signal $V_P$, in FIG. 5E and is indicative of an increase in motor load and a decrease in motor speed. Using this comparison, controller 54 may then select an increased phase operating mode (as illustrated in FIG. 4B) in which additional motor phases are energized to return the speed of motor 10 to its previous level.

A method in accordance with the present invention represent an improvement over conventional devices and methods for detecting changes in motor load and/or motor speed (and controlling a motor in response thereto) because the inventive method may be implemented using relatively small, inexpensive, and reliable integrated circuits. As a result, the size and cost of the motor will be reduced and the reliability of the motor increased.

While the invention has been particularly shown and described with reference to the preferred embodiments thereof, it is well understood by those skilled in the art that various changes and modifications can be made in the invention without departing from the spirit and scope of the invention.

We claim:

1. A method for detecting a change in one of a speed of a motor and a load on said motor, comprising the steps of:

measuring a first number of transitions of a first phase control signal, said first phase control signal associated with a first motor phase of said motor; and, comparing said first number to a predetermined number, said predetermined number indicative of one of a predetermined speed of said motor and a predetermined load on said motor.

2. The method of claim 1 wherein said measuring step includes the substep of monitoring said first phase control signal over a predetermined period.

3. The method of claim 2 wherein said predetermined period comprises at least a portion of an active stage of said first motor phase.

4. The method of claim 1 wherein said measuring step includes the substep of incrementing said first number responsive to one of a rising edge and a falling edge of said first phase control signal.

5. The method of claim 1 wherein said predetermined number comprises a second number of transitions of a second phase control signal, said second phase control signal associated with said first motor phase of said motor.

6. The method of claim 1 wherein said predetermined number comprises a second number of transitions of a second phase control signal, said second phase control signal associated with a second motor phase of said motor.

7. A method for controlling a motor, comprising the steps of:

measuring a first number of transitions of a first phase control signal, said first phase control signal associated with a first motor phase of said motor;

comparing said first number to a predetermined number to obtain a comparison value, said predetermined number indicative of one of a predetermined speed of said motor and a predetermined load on said motor; and, selecting one of a plurality of operating modes for said motor responsive to said comparison value.

8. The method of claim 7 wherein said measuring step includes the substep of monitoring said first phase control signal over a predetermined period.

9. The method of claim 8 wherein said predetermined period comprises at least a portion of an active stage of said first motor phase.

10. The method of claim 7 wherein said measuring step includes the substep of incrementing said first number responsive to one of a rising edge and a falling edge of said first phase control signal.

11. The method of claim 7 wherein said predetermined number comprises a second number of transitions of a second phase control signal, said second phase control signal associated with said first motor phase of said motor.

12. The method of claim 7 wherein said predetermined number comprises a second number of transitions of a second phase control signal, said second phase control signal associated with a second motor phase of said motor.

13. The method of claim 7 wherein said plurality of operating modes includes an increased phase operating mode.

14. A method for controlling a motor, comprising the steps of:

monitoring a first phase control signal over a predetermined period, said first phase control signal associated with a first motor phase of said motor;

incrementing a first number responsive to one of a rising edge and a falling edge of said first phase control signal;

comparing said first number to a predetermined number after said predetermined period to obtain a comparison value, said predetermined number indicative of one of a predetermined speed of said motor and a predetermined load on said motor; and, selecting one of a plurality of operating modes for said motor responsive to said comparison value.

15. The method of claim 14 wherein said predetermined period comprises at least a portion of an active stage of said first motor phase.

16. The method of claim 14 wherein said predetermined number comprises a second number of transitions of a second phase control signal, said second phase control signal associated with said first motor phase of said motor.

17. The method of claim 14 wherein said predetermined number comprises a second number of transitions of a second phase control signal, said second phase control signal associated with a second motor phase of said motor.

18. The method of claim 14 wherein said plurality of operating modes includes an increased phase operating mode.

* * * * *